(12) United States Patent
Langlois et al.

(10) Patent No.: US 7,728,730 B2
(45) Date of Patent: Jun. 1, 2010

(54) SYSTEMS AND METHODS FOR MEASURING THE PURITY OF BALES OF RECYCLABLE MATERIALS

(75) Inventors: Timothy A. Langlois, Fair Haven, VT (US); John A. Kintzer, Waterbury, VT (US)

(73) Assignee: Casella Waste Systems, Inc, Rutland, VT (US)

( * ) Notice: Subject to any disclaimer, the term of this patent is extended or adjusted under 35 U.S.C. 154(b) by 728 days.

(21) Appl. No.: 11/515,806

(22) Filed: Sep. 6, 2006

(65) Prior Publication Data
US 2008/0061125 A1 Mar. 13, 2008

(51) Int. Cl.
*G08B 13/14* (2006.01)
(52) U.S. Cl. ............... 340/572.1; 340/572.4; 340/572.8
(58) Field of Classification Search ............... 340/572.1, 340/572.4, 572.8, 573.1, 571, 568.1, 539.1, 340/539.13, 505, 10.1; 235/492, 375, 383, 235/385
See application file for complete search history.

(56) References Cited

U.S. PATENT DOCUMENTS

| | | | |
|---|---|---|---|
| 4,688,026 A | 8/1987 | Scribner et al. |
| 5,014,206 A | 5/1991 | Scribner et al. |
| 5,121,853 A | 6/1992 | Edelhoff et al. |
| 5,326,939 A | 7/1994 | Schafer et al. |
| 5,340,968 A | 8/1994 | Watanabe et al. |
| 5,392,926 A | 2/1995 | Schafer et al. |
| 5,416,706 A | 5/1995 | Hagenbuch |
| 5,565,846 A | 10/1996 | Geiszler et al. |
| 5,774,876 A | 6/1998 | Woolley et al. |
| 5,804,810 A | 9/1998 | Woolley et al. |
| 5,837,945 A | 11/1998 | Cornwell et al. |
| 5,892,441 A | 4/1999 | Woolley et al. |
| 5,947,256 A | 9/1999 | Patterson |
| 5,959,568 A | 9/1999 | Woolley |
| 6,191,691 B1 | 2/2001 | Serrault et al. |
| 6,206,282 B1 | 3/2001 | Hayes, Sr. et al. |
| 6,211,781 B1 | 4/2001 | McDonald |
| 6,448,898 B1 | 9/2002 | Kasik |
| 6,496,806 B1 | 12/2002 | Horwitz et al. |
| 6,505,106 B1 | 1/2003 | Lawrence et al. |

(Continued)

FOREIGN PATENT DOCUMENTS

EP 0905057 A1 3/1999

(Continued)

OTHER PUBLICATIONS

PCT/US07/005666 International Search Report mailed Dec. 19, 2007 (2 pages).

(Continued)

*Primary Examiner*—Van T. Trieu
(74) *Attorney, Agent, or Firm*—Wilmer Cutler Pickering Hale and Dorr LLP

(57) ABSTRACT

In one embodiment of the present invention, a system includes a radio frequency identification (RFID) reader that is configured to obtain identification information from a plurality of RFID tags respectively attached to the plurality of items. A computer is configured to receive the identification information, and use the identification information to identify the items having a RFID tag attached thereto, and determine a percentage of a desired type of item with respect to the plurality of items.

17 Claims, 6 Drawing Sheets

U.S. PATENT DOCUMENTS

| | | |
|---|---|---|
| 6,520,544 B1 | 2/2003 | Mitchell et al. |
| 6,600,418 B2 | 7/2003 | Francis et al. |
| 6,601,764 B1 | 8/2003 | Goodwin, III |
| 6,687,683 B1 | 2/2004 | Harada et al. |
| 6,690,402 B1 | 2/2004 | Waller et al. |
| 6,694,248 B2 | 2/2004 | Smith et al. |
| 6,759,959 B2 | 7/2004 | Wildman |
| 6,847,892 B2 | 1/2005 | Zhou et al. |
| 6,867,683 B2 | 3/2005 | Calvesio |
| 7,117,160 B1 | 10/2006 | Haynes et al. |
| 7,278,571 B2 | 10/2007 | Schmidtberg et al. |
| 7,287,694 B2 * | 10/2007 | Banavar et al. ............. 235/383 |
| 7,313,602 B2 | 12/2007 | Ono et al. |
| 7,416,134 B2 * | 8/2008 | McDonald ................ 235/492 |
| 2002/0105424 A1 | 8/2002 | Alicot et al. |
| 2002/0154915 A1 | 10/2002 | Bullock et al. |
| 2002/0170685 A1 | 11/2002 | Weik et al. |
| 2002/0196150 A1 | 12/2002 | Wildman |
| 2003/0067381 A1 | 4/2003 | Mitchell et al. |
| 2003/0112155 A1 | 6/2003 | Landre et al. |
| 2003/0132853 A1 | 7/2003 | Ebert |
| 2003/0158795 A1 | 8/2003 | Markham et al. |
| 2003/0227392 A1 | 12/2003 | Ebert et al. |
| 2004/0004119 A1 | 1/2004 | Baldassari et al. |
| 2004/0012481 A1 | 1/2004 | Brusseaux |
| 2004/0021579 A1 | 2/2004 | Oursler et al. |
| 2004/0027243 A1 | 2/2004 | Carrender |
| 2004/0046672 A1 | 3/2004 | Kasik et al. |
| 2004/0129781 A1 | 7/2004 | Kreiner et al. |
| 2004/0133484 A1 | 7/2004 | Kreiner et al. |
| 2004/0153379 A1 | 8/2004 | Joyce et al. |
| 2004/0178264 A1 | 9/2004 | Linton et al. |
| 2004/0199785 A1 | 10/2004 | Pederson |
| 2005/0004702 A1 | 1/2005 | McDonald |
| 2005/0055582 A1 | 3/2005 | Bazakos et al. |
| 2005/0285743 A1 | 12/2005 | Weber |
| 2006/0251498 A1 | 11/2006 | Buzzoni et al. |
| 2007/0260466 A1 * | 11/2007 | Casella et al. .................. 705/1 |
| 2008/0191009 A1 | 8/2008 | Gressel et al. |

FOREIGN PATENT DOCUMENTS

| | | |
|---|---|---|
| EP | 07060985 B1 | 3/2000 |
| EP | 1477430 A1 | 11/2004 |

OTHER PUBLICATIONS

Fanelli, T. "Coastal Computer Corporation's ESC Software Extend Best Software's Peachtree Capabilities," WorldWire, Mar. 10, 2004 (2 pages).

WayBackMachine, SpiderWeave.com Terms of Service, Available at http://webarchive.org/web*//http://spiderweave.com/policies/terms-of-services.html. Accessed Sep. 15, 2008 (4 pages).

SwiftCD.com, "SwiftCD Late Payment Policy," Available at http://web.archive.org/web/20050310094935/http://www.swiftcd.com/faq.late.html. Accessed Mar. 21, 2009 (2 pages).

Murphy, P. "Tennessee Regulatory Authority Memorandum," Jul. 20, 2006 (3 pages).

Electronic Services Control website "Whats New," Available at http://web.archive.org/web/20040404035817/coastalcomputercorporation.com/html/overview. Accessed Sep. 14, 2008 (17 pages).

* cited by examiner

300

| 8 | 28 | 24 | 36 |

Tag Version Number 302

Domain Manager Identifier 304

Object Class Identifier 306

Unique Identifier 308

| Domain Manager Identifier ~304 | Object Class Identifier ~306 | Item Type ~210 | Material ~208 | Weight (grams) ~206 |
|---|---|---|---|---|
| Company A | 1 | 16 oz bottle | glass | 100 |
| Company A | 2 | 12 oz can | aluminum | 5 |
| Company B | 1 | 12 oz can | aluminum | 5 |
| Company B | 2 | 750 ml bottle | glass | 140 |
| Company B | 3 | 1/2 gallon container | plastic | 25 |
| . . . | . . . | | | |

| Bale ID | Item Type | Material | Bale Weight (pound) | Purity (by weight) | Status |
|---|---|---|---|---|---|
| 00045 | 16 oz bottle | glass | 111 | 97% | In store |
| 00046 | 12 oz can | aluminum | 100 | 94% | Sent to buyer A |
| 00047 | 12 oz can | aluminum | 101 | 92% | In store |
| 00048 | 750 ml bottle | glass | 122 | 87% | In store |
| 00049 | 1/2 gallon container | plastic | 98 | 90% | Sent to buyer B |
| . | | | | | |
| . | | | | | |
| . | | | | | |

Figure 5

SYSTEMS AND METHODS FOR MEASURING THE PURITY OF BALES OF RECYCLABLE MATERIALS

RELATED APPLICATION

This application is related to the following copending and commonly assigned patent application, which is incorporated herein by reference in its entirety: "Systems and Methods for Indicating a Quality of Grouped Items," having application Ser. No. 11/515,789, and filed on Sep. 6, 2006.

BACKGROUND OF THE INVENTION

1. Field of the Invention

Embodiments of the present invention relate to the field of collecting recyclable materials and, more particularly, to systems and methods for determining the composition and purity of a quantity of recyclable materials.

2. Background Description

To meet the growing problem of post-consumer goods disposal, many recyclable post-consumer goods are collected from the curbside and sent to a material recovery facility (MRF). MRFs are facilities where mixed recyclable materials are sorted and baled for sale, and generally serve as drop-off and gross-sorting (and limited processing) points for recyclable materials, so that sorted recyclable materials can be transported, for example, to a facility for subsequent processing.

Recyclable materials generally enter a MRF either in a single stream or dual stream. A single stream MRF may receive a mixture of commingled containers that may be made of glass, plastics, and/or metals, and fiber material that may include old news print (ONP) (e.g., newspaper and newspaper inserts), old corrugated paper (OCC), old telephone directories (OTD), old magazines (OMG), junk mail and/or office paper. A dual stream MRF generally has separate commingled container and fiber material streams.

Generally, recyclable materials arriving at MRFs can be sorted into individual material categories, such as glass, plastic, steel, aluminum, paper, cardboard, and the like. In addition, clear glass can be separated from colored glass, and plastics can be separated by type and color. Materials such as plastic, steel, aluminum, paper, and cardboard, can then be baled in a standard manner. Bales can be stored at an MRF until a buyer, such as a glass plant or paper recycling facility, purchases them.

While traditional MRFs typically utilize a dual stream configuration, the desire to reduce labor and other operational costs has been an impetus behind the trend toward single stream MRFs. However, sorted recyclable materials produced by single stream MRFs can have a higher contamination level than sorted recyclable materials from dual stream MRFs. Thus, for example, bales of sorted plastic from a single stream MRF may have an average purity of 95% by weight, whereas bales of sorted plastic from a dual stream MRF may have an average purity of 97% by weight.

In known systems, bale-specific information regarding purity is not generally ascertainable until you break open the bale. Accordingly, bales are typically sold based on physical accessibility of the bales within a MRF at the time of shipment. Lack of information pertaining to the purity of the bales can result in bales being rejected by the purchaser and returned to a MRF, or downgraded by the purchaser. This forces MRFs to absorb the cost associated with the returned bale(s), or to refund a portion of the sales price, particularly for bales emanating from single stream MRFs that generally have higher contamination rates than bales emanating from dual stream MRFs.

We have discovered that systems and methods for accurately and efficiently measuring the composition and purity of a bale and providing verifiable bale-specific information are needed. Such systems and methods can be used to ensure the purity of bales, increase customer satisfaction, and generate price premiums for the bales that are determined to have, for example, a higher than average level of purity.

SUMMARY OF EMBODIMENTS OF THE INVENTION

Embodiments of the present invention relate to systems and methods for measuring the purity of bales of recyclable material. Various embodiments of the present invention use radio frequency identification (RFID) technology to determine the composition of a bale of waste items and to calculate the purity of a bale of recyclable material.

In one embodiment of the present invention, a system includes a radio frequency identification (RFID) reader configured to obtain identification information from a plurality of RFID tags respectively attached to at least a portion of a plurality of items. A computer is configured to receive the identification information, and use the identification information to identify the items having a RFID tag attached thereto, and determine a percentage of a desired type of item with respect to the plurality of items. The system also include an optical counter for counting a total number of the plurality of items.

The computer calculates a measurement of purity that includes a percent weight of items of the desired type among the plurality of items with respect to a total weight of the plurality of items. The system also includes or utilizes a scale for measuring the total weight of the plurality of items.

The computer is further configured to calculate a total weight of items of the desired type by identifying each of the items of the desired type using the identification information and determining a combined weight of each of the identified items. The computer is also configured to calculate a total weight of items of the desired type by identifying each item other than the items of the desired type among the plurality of items using the identification information, and subtracting a weight of each of the identified other items from the total weight of the plurality of items.

The system also includes or utilizes a baler that creates a bale comprising the plurality of items. The computer includes or utilizes a repository for storing identification information of a bale that includes the plurality of items, and, in connection with the identification information of the bale, the percentage of the desired type of item with respect to the plurality of items.

The system also includes or utilizes a RFID tag programmer configured to write the percentage onto a RFID tag associated with the bale. The system also includes or utilizes a second RFID reader that reads the identification information of the bale from the bale RFID tag, wherein the computer receives the identification information and updates the repository indicating that the bale is no longer available.

In another embodiment of the present invention, a method includes reading identification information from a plurality of RFID tags respectively attached to at least a portion of a plurality of items, and receiving the identification information at a computing device that identifies each of the items having a RFID tag attached thereto. A percentage of a desired type of item is calculated with respect to the plurality of items.

The method also includes baling the plurality of items to form a bale, and writing the calculated percentage onto a RFID tag associated with the baled items. The percentage pertains to a quantity of items of the desired type among the plurality of items with respect to a total quantity of the plurality of items.

The method also includes weighing the plurality of items. When weighing the plurality of items, the calculated percentage pertains to a percent weight of items of the desired type among the plurality of items with respect to a total weight of the plurality of items.

In addition, the method includes attaching to the bale a RFID tag having the calculated percentage written thereon, and storing in a data repository the calculated percentage. The data repository can be updated to reflect that a particular bale is no longer available.

BRIEF DESCRIPTION OF THE DRAWINGS

The Detailed Description of the Invention, including the description of various embodiments of the invention, will be best understood when read in reference to the accompanying figures wherein:

FIG. 5 is an exemplary data repository that contains bale specific information.

DETAILED DESCRIPTION OF THE INVENTION

Figure 1:
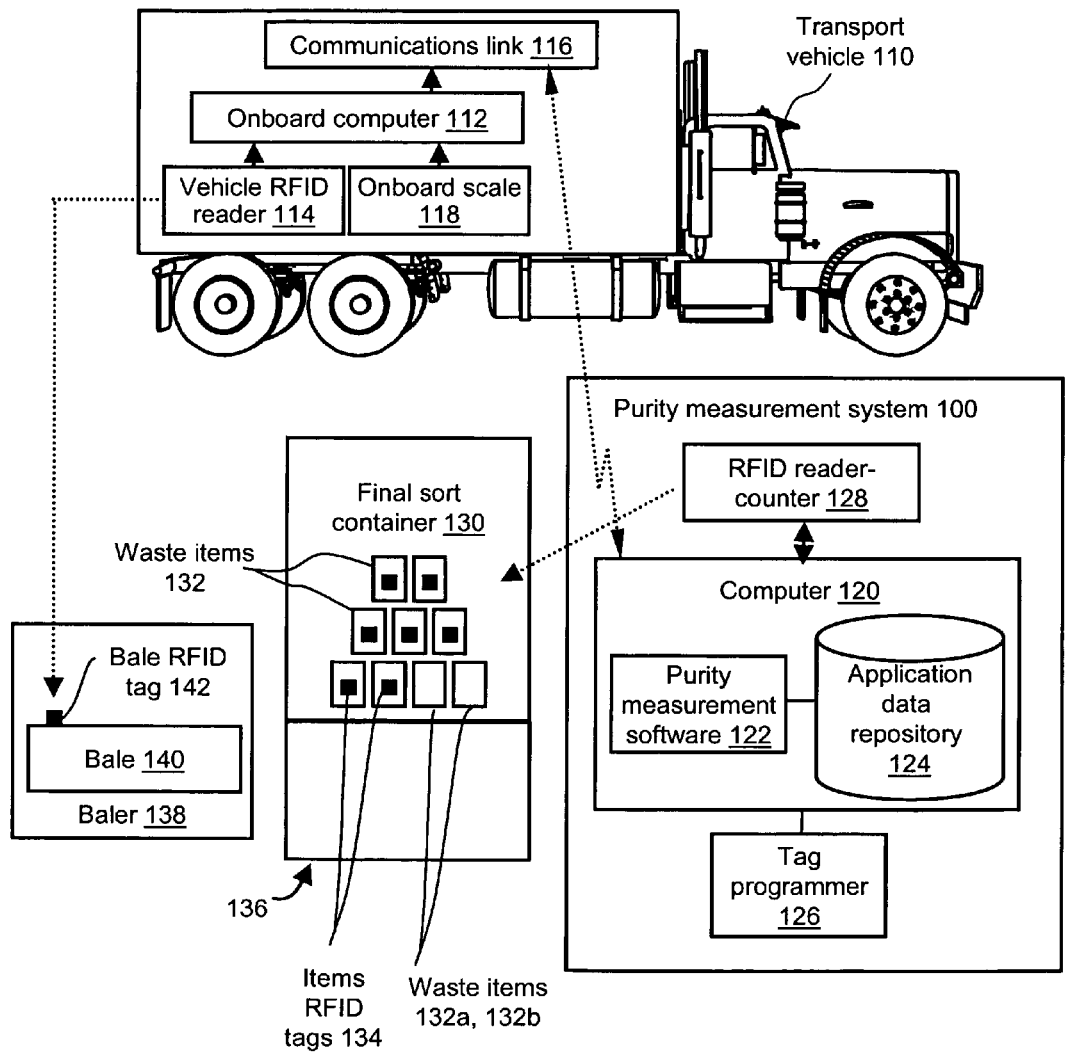
FIG. 1 is an exemplary block diagram of an embodiment of a purity measurement system.

FIG. 1 is a block diagram depicting purity measurement system 100 that can be used in a material recovery facility (MRF). System 100 includes general purpose computer 120, which in turn includes purity measurement software 122 and application data repository 124. System 100 also includes RFID reader-counter 128, and tag programmer 126.

Computer 120 can include industry standard components (not shown), such as a user interface (e.g., a keyboard and a mouse) and display (e.g., a monitor), a processor, a storage device such as a standard hard disk, a CD-ROM and/or CD-RW drive(s), a clock device for providing timestamp data, and/or standard interfaces (e.g., USB ports).

FIG. 1 also includes final sort container 130, scale 136, and baler 138. Container 130 contains waste items 132, which can be glass containers, plastic containers, aluminum containers, ferrous items, fiber products such as paper and cardboard, and/or other types of waste items. Container 130 can be any type of container for collecting waste items 132, 132a, 132b.

Waste items 132 can have item RFID tags 134 affixed. Each of RFID tags 134 can contain identification information, such as a digital serial number identifying the corresponding recyclable item, and/or information regarding the type of the item. RFID reader-counter 128 can be used to count items 132 going into container 130, and, read tags 134 in order to extract the identification information contained therein. RFID reader-counter 128 can send the extracted identification information to computer 120, which utilizes purity measurement software 122 and repository 124 to obtain information regarding waste items 132, such as item weight and type of material.

Reader-counter 128 can be a commercially available RFID tag reader system, such as the TI RFID system, manufactured by Texas Instruments Incorporated (Dallas, Tex.). RFID reader-counter 128 is positioned so that RFID tags 134 of waste items 132 are within its effective range. Waste items 132 are used to form or generate a bale 140. Multiple bales of waste items can be stored at a MRF as inventory before they are sold and removed from the MRF.

Purity measurement software 122 uses repository 124 to analyze identification information obtained from tags 134 using RFID reader 128. Repository 124 can include information regarding different types of waste items 134, such as item weight and type of material (e.g., glass container, plastic container, aluminum container, or paper product). In addition, repository 124 can also include any other information, such as information regarding bales stored at the MRF.

Figures 2A, 2B:
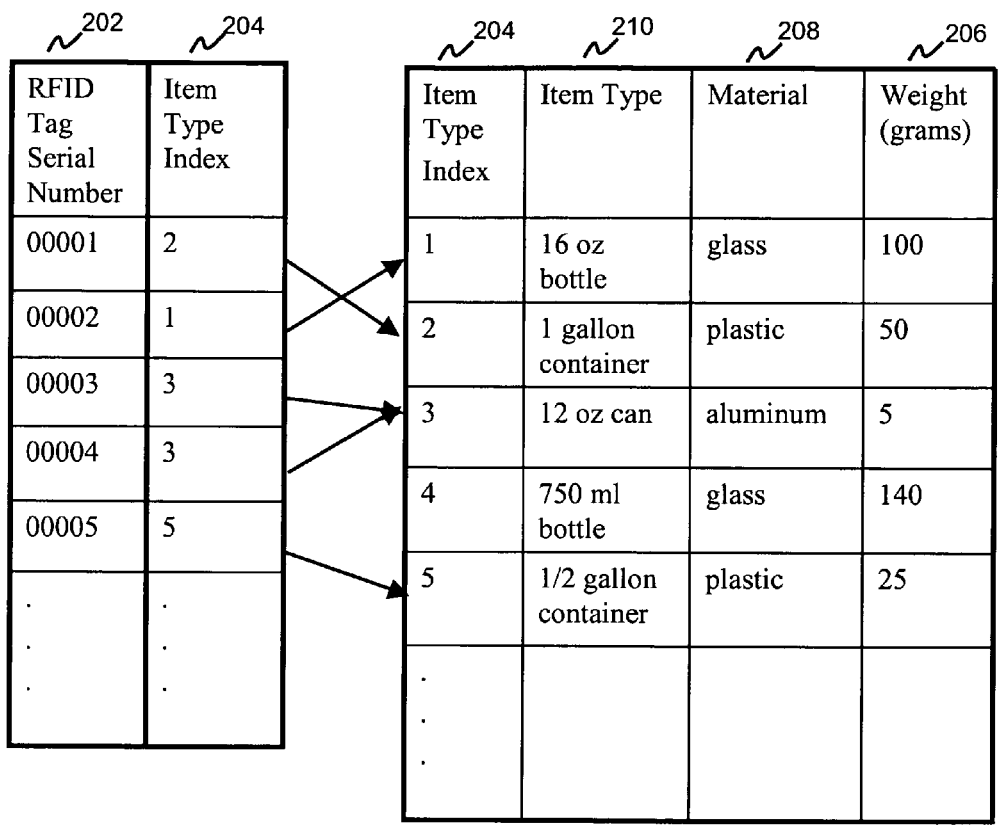
FIG. 2A is an exemplary data repository of a serial number contained on a radio frequency identification (RFID) tag.
FIG. 2B is an exemplary data repository providing product information respectively associated with the RFID tag serial numbers shown in FIG. 2A.

FIGS. 2A and 2B, taken together, illustrate one example of repository 124. FIG. 2A is a table indexed by serial numbers 202 and associating serial numbers 202 with item type indexes 204. FIG. 2B is a table indexed by item type indexes 204. The table in FIG. 2B contains information relating to weight 206, type of material 208, and item type 210 for various types of items 132. Therefore, in this example, using a serial number 202 identifying a recyclable item, software 122 can cross-reference repository 124 to determine the weight 206 and type of material 208 of the recyclable item. If the serial number is 00004, as shown in FIG. 2A, software 122 can determine that the corresponding item 204 is a 12 ounce aluminum can 210 weighing 5 grams 206.

Implementation of repository 124 is not limited to the example illustrated in FIGS. 2A and 2B; various implementations of repository 124 can be used to achieve the same results. The implementation of repository 124 may also vary depending on the type of identification information contained in RFID tags 134.

Figures 3A, 3B:
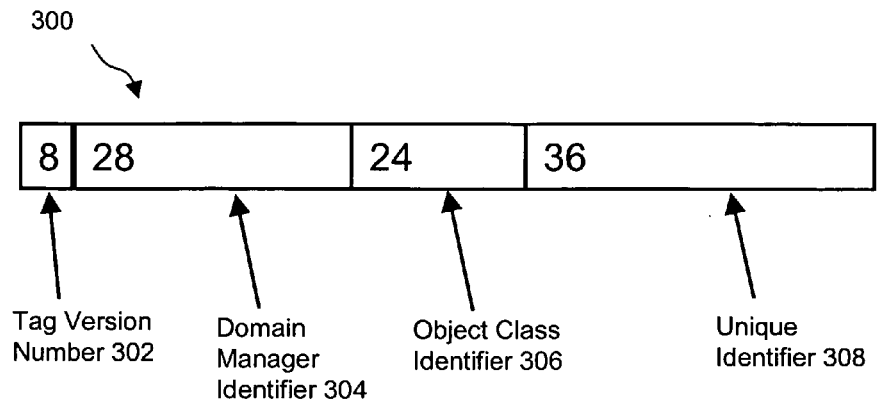
FIG. 3A is a 96-bit EPC™ structure that can be used in conjunction with one or more embodiments of the present invention.
FIG. 3B is an exemplary repository that utilizes at least a portion of the data contained in FIG. 3A.

For example, FIG. 3A, generally at 300, illustrates the Electronic Product Code (EPC), which is a standard format for storing identification information in RFID tags. The EPC is designed to replace the Universal Product Code (UPC) currently utilized in conjunction with barcodes. An EPC-96 code has four components:

(a) an 8-bit tag version number 302, indicating the tag type (e.g., 96-bit EPC Class 1);

(b) a 28-bit domain manager identifier 304, such as a number specifying the entity that administers the tag code (e.g., "ABC Co.");

(c) a 24-bit object class identifier 306, such as a number specifying the type of product the RFID tag is attached to (e.g., "16 oz. Coca-Cola bottle"); and (d) a 36-bit unique identifier 308, which is a number that, in combination with the other EPC components, uniquely identifies the tag (and object).

If RFID tags 134 utilize, for example, the EPC as illustrated in FIG. 3A, or a similar or related technique, repository 124 can be implemented accordingly. For example, repository 124 can include a table as illustrated in FIG. 3B, containing entries indexed by the 28-bit domain manager identifier 304 and the 24-bit object class identifier 306. Entries in the table can also include weight 206 and type of material 208 associated with a certain type of recyclable item. Therefore, in this example, after receiving an EPC-96 code containing domain manager identifier 304 representing Company B and object class identifier (306) 1, software 122 can cross reference the table in FIG. 3B and determine that the corresponding item is a 12 ounce aluminum can weighing 5 grams.

Figure 4:
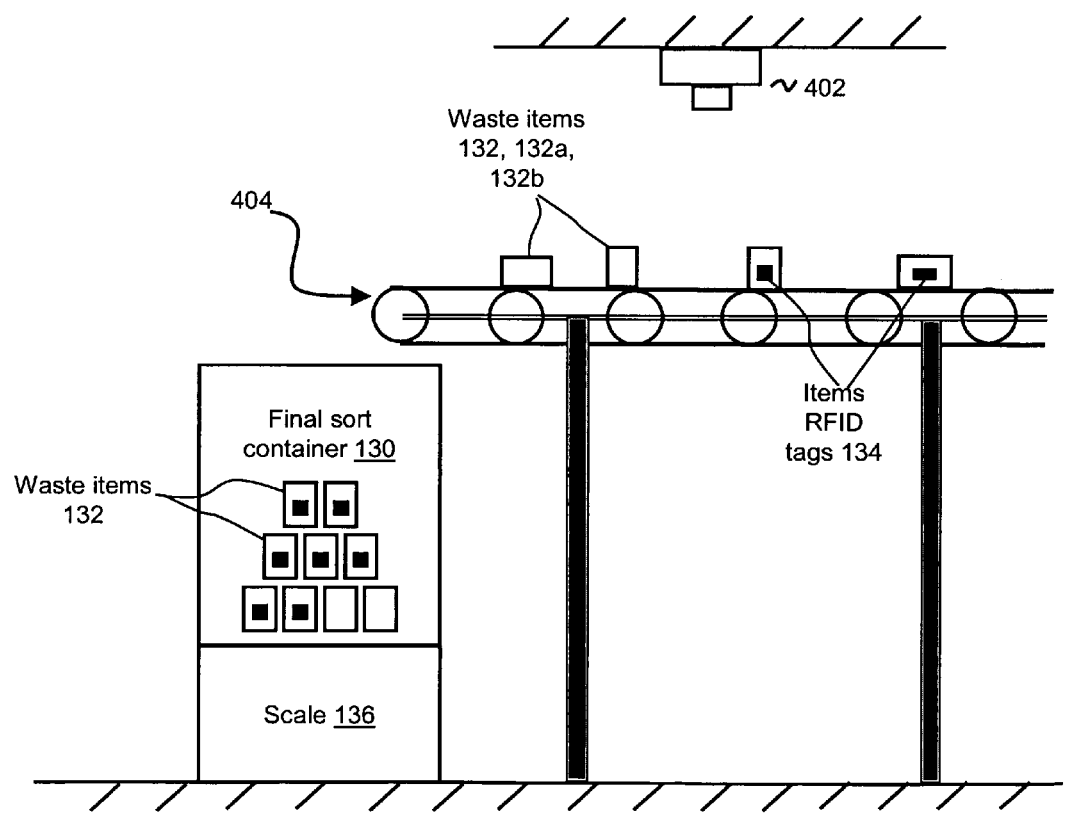
FIG. 4 is an exemplary arrangement of an optical reader that can be used in conjunction with one or more embodiments of the present invention.

Certain waste items, such as items 132a, 132b illustrated in FIG. 1, may not have RFID tags 134 respectively attached thereto. For example, paper products, such as newspaper and/or cardboard, may typically not have RFID tags 134 attached thereto. For these items, as illustrated in FIG. 4, an optical counter 402 can be utilized to count the number of waste items 132 that will be included in any particular bale. An optical counter 402, such as the MSS Sapphire™ or MSS Aladdin™ optical sorters, manufactured by MSS, Inc., Nashville, Tenn., can be used. When a MSS Sapphire™ or MSS Aladdin™ optical sorter is used, optical counter 402 can be arranged to receive items from conveyor system 404. When items 132, 132a, 132b move toward container 130 on a conveyer system 404 to be collected and baled, optical counter 402 can be utilized to count items 132 having RFID tags 134 affixed thereto, as well as items 132a, 132b that do not have an RFID tag affixed thereto.

Scale 136 can be used to weight items 132, 132a, 132b. Scale 136 can be a general industrial weighing scale, such as the Siltec WS2000L, distributed by Precision Weighing Balances (Bradford, Mass.).

Returning now to FIG. 1, baler 138 can be used to transform loose items 132 to a baled commodity, as represented by bale 140, upon which a bale RFID tag 142 can be affixed. Baler 138 can be any standard equipment that is used to compress and bind a recyclable material, such as aluminum, plastic or paper items 132, 132a, 132b. Baler 138 can be, for example, a 1060XDVB Baler by Wastecare Corporation (Atlanta, Ga.), which is an industrial, high-capacity, high-volume baler. Bale 140 includes items 132, 132a, 132b that are bound tightly or wrapped, as is the industry standard for recyclable materials. Bale RFID tag 142 is an RFID tag device that can be written by tag programmer 126. Tag programmer 126 can be a reader/writer device, such as the SkyeModule™ M1 device supplied by SkyeTek, Inc. (Boulder, Colo.), that can write information to RFID tag 134.

Additionally, FIG. 1 depicts transport vehicle 110, which in turn includes computer 112, RFID reader 114, communications link 116, and onboard scale 118. Vehicle 110 is, for example, a conventional hauling truck that is used to carry and deliver recyclable material bales. Typically, vehicle 110 picks up recyclable material from an originator point such as a MRF and delivers the recyclable material to an awaiting customer, such as a glass or paper recycling facility.

Onboard computer 112 can be a general-purpose computer. In some embodiments, computer 112 is a mobile computing device, such as one supplied by Glacier Computing (New Milford, Conn.) or by Mobile Computing Corp. Inc. (Mississauga, Ontario), that is physically integral to vehicle 110. Computer 112 can include industry standard components (not shown), such as a user interface and display, a processor, a storage device such as a standard hard disk, a CD-ROM and/or CD-RW drives, a clock device for providing timestamp data, and/or standard interfaces (e.g., USB ports) for connecting to reader 114, scale 118, and/or communications link 116.

RFID reader 114 can be a commercially available RFID tag reader system, such as the TI RFID system, manufactured by Texas Instruments (Dallas, Tex.). In one or more embodiments, RFID reader 114 is a wired or wireless handheld reader that can be easily moved by an operator of vehicle 110. In one or more embodiments, RFID reader may be separate from (e.g., removable from) transport vehicle 110.

Communications link 116 can be any standard wired or wireless communications device and/or network that allow data to be exchanged between computer 112 and computer 120. Onboard scale 118 can be any commercially available scale mechanism, such as the weigh-in motion weighing system, supplied by Mobile Computing Corp. Inc. (Mississauga, Ontario).

In operation, RFID reader-counter 128 reads items RFID tags 134 affixed to items 132 before or after they are deposited into final sort container 130. Software 122 utilizes repository 124 (e.g., as illustrated in FIGS. 2A, 2B, and 3B) to identify items 132. Furthermore, software 122 determines a measurement of purity of items 132, as will be described in connection with FIG. 5. In addition, scale 136 can obtain and transmit the combined weight of items 132, 132a, 132b to computer 120, which can store the combined weight in repository 124.

Baler 138 receives items 132, 132a, 132b within container 130, and transforms items 132, 132a, 132b into bale 140 in a standard manner. Tag programmer 126 can write bale specific information (e.g., purity measurement determined by software 122) onto bale RFID tag 142.

As bale 140 is loaded onto vehicle 110, bale RFID tag 142 can be read by RFID reader 114. Onboard scale 118 can also be used to weigh bale 140. Onboard computer 112 can store the bale specific information and transmit the information to computer 120 via communications link 116, so that computer 120 can keep track of which bales have been loaded onto vehicle 110 and which bales remain at the MRF.

For example, FIG. 5 is a table 500 containing bale specific information that can be stored in repository 124. The table includes entries representing bales created in the MRF. An entry in the table can include a bale ID 502, the type of items 210 in the corresponding bale, the type of material 208 in the bale, the weight of the bale 504, and a purity measurement 506 (e.g., a weigh percent) for the bale. An entry in table 500 can also include a status field 508 indicating whether the corresponding bale is still in the MRF, or whether it has been shipped out to a buyer.

Figure 6:
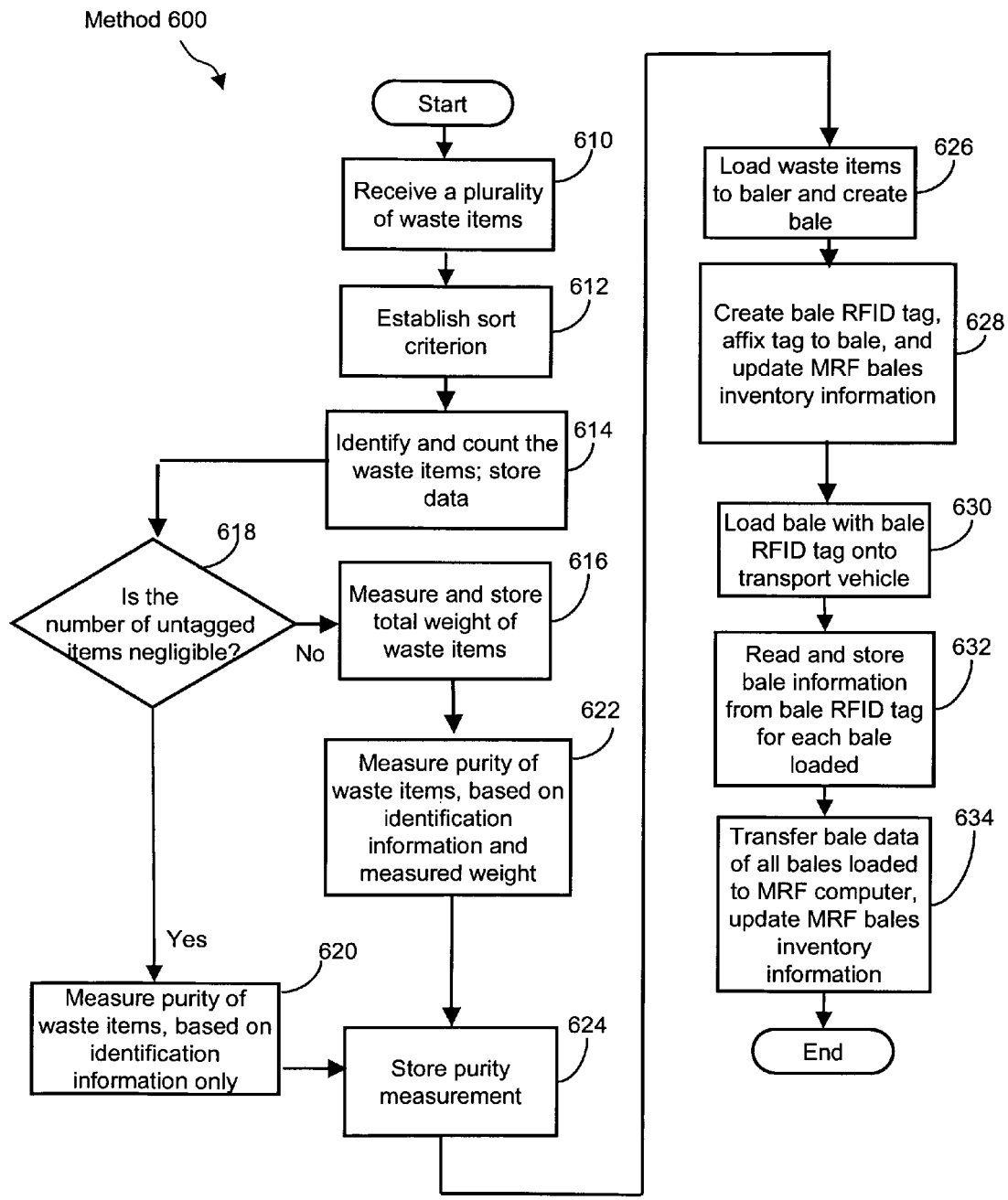
FIG. 6 is an exemplary flow chart illustrating a method for measuring the purity of bales of recyclable materials.

FIG. 6 is a flow chart illustrating a method 600 for measuring the purity of bales and of recyclable materials. The following describes method 600 as being performed using system 100, generally with reference to FIG. 1.

At step 610, a number of waste items 132, 132a, 132b are received. Items 132, 132a, 132b can be the output of a sort process, and therefore can include a high percentage of objects of the same type. For example, items 132, 132a, 132b can include a high percentage of aluminum containers. However, the sort process can be imperfect, so that a relatively small percentage of contaminants or other material types (e.g., glass containers, paper products), with or without RFID tags 134 affixed thereon, can be present.

At step 612, a sort criterion can be established using purity measurement software 122. A sort criterion can specify one or multiple types of material that is intended to be included in bale 140 that includes items 132, 132a, 132b. Measurement of the purity of bale 140 can be based on the percentage of items 132 that satisfy the sort criterion, or the percentage weight of items 132 that satisfy the sort criterion. Waste material or items 132a, 132b not satisfying the sort criterion may be viewed as contamination. Different purchasers of bales may require different purity levels. For example, one purchaser of aluminum bales may require a maximum of 2% contamination (by weight or item count), while another may be willing to accept up to 5% contamination.

At step 614, items 132, 132a, 132b are identified and counted. RFID reader-counter 128 counts the number of items 132 that have RFID tags 134 affixed thereon, and reads identification information, such as weight 206, from tags 134. If desirable, optical counter 402 can be utilized to count the total number of items 132, 132a, 132b, as discussed in connection with FIG. 4. If optical counter 402 and RFID reader-counter 128 are used in combination, the number of items 132 that have RFID tags 134 attached thereon and the number of untagged items 132a, 132b can both be ascertained. Identification information obtained by reader-counter 128 can be stored in repository 124.

If it is determined at decision step 618 that the number of untagged items 132a, 132b is not negligible, then, at step 616, the total weight of items 132, 132a, 132b can be measured by scale 136 and stored in repository 124. At step 622, the weight percent is calculated based on the weight 206 information obtained in step 614 and the total weight obtained in step 616.

For example, if the sort criterion of step 612 is set as plastic containers, software 122 can query repository 124 using the identification information from each RFID tag 134, to determine the type 210 and weight 206 of each corresponding item. Software 122 can then sum the weight of each of items 132 that is determined to be a plastic container to obtain the total weight of plastic containers. The percentage weight of items that satisfies the sort criterion can then be calculated as:

$$X=(\Sigma W_i)/T_{WEIGHT}$$

where X is the percentage weight of the items that meet the sort criterion;

$W_i$ represents the individual weight of each item that meets the sort criterion; and $T_{WEIGHT}$ is the total weight of all items 132, 132a, 132b, as captured by scale 136.

If RFID reader-counter 128 reads and accounts for 10,000 plastic containers, and repository 124 indicates that each container weighs 0.05 pounds, then the total weight of plastic containers is 500 pounds. If scale 136 records the weight in container 130 as being approximately 560 pounds, the purity measurement can then be calculated, according to the above formula, as X=(500 pounds)/(560 pounds)=0.89 (and 11% contaminants).

Unlike plastic containers, glass bottles often break during a sort process, resulting in untagged broken glass pieces being received at step 610, as well as tagged pieces that have less weight than what the tags indicate. However, by statistical approximation, the total weight of the glass pieces can be calculated by summing the weight of the original unbroken bottles. Therefore, the weight percent may be calculated as described above.

The sort criterion of step 612 may also be set to a type of items 132a, 132b that do not have RFID tags affixed thereon. For example, waste items received in step 610 may include mostly of paper products that are untagged. If the number of untagged items 132a, 132b excluding the paper products is negligible, the total weight of the paper products can be calculated by subtracting the weight of items 132 from the total weight of items 132, 132a, 132b obtained in step 616. The weight percent can then be calculated by dividing the total weight of the paper products by the total weight of items 132, 132a, 132b.

If at decision step 618 it is determined that the number of untagged items is negligible (e.g., if optical counter 402 in FIG. 4 counted substantially the same number of items as counted by reader-counter 128 in FIG. 1), then, at step 620, software 122 can determine or approximate the purity of bale 140 in terms of the weight percentage of certain types of recyclable items without measuring the total weight of items 132, 132a, 132b as in step 616. This is a consequence of the total weight of items 132, 132a, 132b being approximated by summing the calculated weight of each of items 132. For example, software 122 may query repository 124 using identification information 202 obtained from each of RFID tags 134 to determine the weight of each of items 132. The percentage weight can then be approximated by calculation by dividing the total weight of items 132 that meet the sort criterion by the total weight of all items 132.

Other measurements of purity, such as the percentage of items 132 that meet the sort criterion of step 612, may also be calculated. For example, after step 614, software 122 can query repository 124 using identification information 202 obtained from each of RFID tags 134 to determine a material type for each of items 132 that has an RFID tag affixed thereon, and count the number of items 132 for a particular material type specified in the sort criterion. The percentage of items 132 that meet the sort criterion of step 612 can be calculated as follows:

$$X=RFID_{C1}/(RFID_{C1}+RFID_{C2})$$

where X is the percentage of items that meet the sort criterion;

$RFID_{C1}$ is the number of items that meet the sort criterion; and $RFID_{C2}$ is the number of items that do not meet the sort criterion.

As an example, the sort criterion may be set as aluminum containers. Assuming that all (or substantially all) aluminum containers have tags 134 attached thereto, software 122 determines that 10,000 items meet the sort criterion. In step 614, the total number of items 132, 132a, 132b is determined to be 10500 (i.e., there are 500 other items, tagged or untagged). At step 620, the percentage of items 132 that meet the sort criterion is therefore, $$X=RFID_{C1}/(RFID_{C1}+RFID_{C2})$$

$$X=10,000/(10,000+500)$$

$$X=0.95 \text{ or } 95\% \text{ aluminum containers (and 5\% other)}$$

At step 624, the purity measurement can be stored in repository 124. At step 626, items 132, 132a, 132b in container 130 can be loaded into baler 138 and compressed into bale 140.

At step 628, computer 120 can retrieve data that represents the contents of bale 140 from repository 124 (e.g., the sort criterion, total weight, and/or the purity measurement calculated) and use tag programmer 126 to write this data to bale RFID tag 142, which can be affixed to bale 140. Computer 120 may further update MRF bale inventory information, so MRF personnel are informed or can access repository 124 to determine, for example, that a bale with certain purity has been added to the MRF bale inventory.

At step 630, bale 140 with tag 142 affixed thereon can be loaded onto vehicle 110. At step 632, vehicle RFID reader 114 can read tag 142, and onboard computer 112 can store the data obtained from tag 142.

At step 634, data read from RFID tags (e.g., tag 142) associated with bales (e.g., bale 140) that are loaded on vehicle 110 can be transferred from onboard computer 112 to computer 120 via communications link 116. This data represents all bales loaded on vehicle 110. Computer 120 may further update MRF inventory information (e.g., as illustrated in FIG. 5), so MRF personnel can know exactly which bales remain in the MRF inventory.

Other embodiments, extensions, and modifications of the ideas presented above are comprehended and within the reach of one skilled in the art upon reviewing the present disclosure.

Accordingly, the scope of the present invention in its various aspects should not be limited by the examples and embodiments presented above. The individual aspects of the present invention, and the entirety of the invention should be regarded so as to allow for modifications and future developments within the scope of the present disclosure. The present invention is limited only by the claims that follow.

The invention claimed is:

1. A system for determining a purity of a bale comprising a plurality of recyclable waste items, comprising:
    a radio frequency identification (RFID) reader configured to obtain identification information from a plurality of RFID tags respectively attached to at least a portion of the plurality of recyclable waste items; and
    a computer configured to receive the identification information, and query a repository using the identification information to determine type and weight of each of the recyclable waste items having the RFID tag attached thereto, and determine a percentage of a desired type of item with respect to the plurality of recyclable waste items.

2. The system of claim 1, further comprising an optical counter for counting a total number of the plurality of items.

3. The system of claim 1, wherein the computer calculates a measurement of purity comprising a percent weight of items of the desired type among the plurality of items with respect to a total weight of the plurality of items.

4. The system of claim 3, further comprising a scale for measuring the total weight of the plurality of items.

5. The system of claim 3, wherein the computer is further configured to calculate a total weight of items of the desired type by identifying each of the items of the desired type using the identification information and determining a combined weight of each of the identified items.

6. The system of claim 3, wherein the computer is further configured to calculate a total weight of items of the desired type by identifying each item other than the items of the desired type among the plurality of items using the identification information, and subtracting a weight of each of the identified other items from the total weight of the plurality of items.

7. The system according to claim 1, further comprising a baler that creates the bale comprising the plurality of items.

8. The system of claim 1, wherein the computer stores in the repository identification information of a bale comprising the plurality of items, and, in connection with the identification information of the bale, the percentage of the desired type of item with respect to the plurality of items.

9. The system of claim 8, further comprising a RFID tag programmer configured to write the percentage onto a RFID tag associated with the bale.

10. The system of claim 9, further comprising a second RFID reader that reads the identification information of the bale from the bale RFID tag, wherein the computer receives the identification information and updates the repository indicating that the bale is no longer available.

11. A method for determining a purity of a bale comprising a plurality of recyclable waste items, the method comprising:
    reading identification information from a plurality of radio frequency identification (RFID) tags respectively attached to at least a portion of the plurality of recyclable waste items;
    querying a repository using the identification information from the plurality of RFID tags to determine type and weight of each of the recyclable waste items having the RFID tag attached thereto;
    calculating a percentage of the desired type of recyclable waste item with respect to the plurality of recyclable waste items;
    baling the plurality of recyclable waste items to form the bale; and
    writing the calculated percentage onto a RFID tag associated with the baled recyclable waste items.

12. The method of claim 11, wherein the percentage pertains to a quantity of items of the desired type among the plurality of items with respect to a total quantity of the plurality of items.

13. The method of claim 11, further comprising weighing the plurality of items.

14. The method of claim 13, wherein the calculated percentage pertains to a percent weight of items of the desired type among the plurality of items with respect to a total weight of the plurality of items.

15. The method of claim 11, further comprising attaching to the bale a RFID tag having the calculated percentage written thereon.

16. The method of claim 15, further comprising storing in the data repository the calculated percentage.

17. The method of claim 16, further comprising updating the data repository to reflect that a particular bale is no longer available.

* * * * *